June 5, 1923.

E. F. SHIMER ET AL

BRAKE SHOE SPREADER

Filed Feb. 6, 1922

1,458,080

Edward F. Shimer
&
Raymond I. Frey.
INVENTOR

BY Victor J. Evans
ATTORNEY

WITNESS:

Patented June 5, 1923.

1,458,080

UNITED STATES PATENT OFFICE.

EDWARD F. SHIMER AND RAYMOND I. FREY, OF PHILLIPSBURG, NEW JERSEY.

BRAKE-SHOE SPREADER.

Application filed February 6, 1922. Serial No. 534,526.

*To all whom it may concern:*

Be it known that we, EDWARD F. SHIMER and RAYMOND I. FREY, citizens of the United States, residing at Phillipsburg, in the county of Warren and State of New Jersey, have invented new and useful Improvements in Brake-Shoe Spreaders, of which the following is a specification.

This invention relates to brake shoe spreaders and it has more particular reference to that form or type of device which is adapted for use in connection with the brake shoes employed on automobiles or similar vehicles, the primary object being to provide a novel device that may be sprung over and held firmly upon a worm brake cam to bring said brake cam back to normal size and thereby increase the throw of the brake cam to take up for wear on the opposed faces of the brake shoe between which the cam operates.

A further object of our invention is to provide a novel device of the foregoing identified character which consists of an elliptical band split throughout its longitudinal length with what may be termed in plan as a feather or V-shaped slit, the apex of said V-shaped slit being adapted to automatically centralize the band and retain the opposed ends of said band or sleeve in proper registration relative to the brake cam.

In the further disclosure of the invention reference is to be had to the accompanying sheet of drawings illustrative of a preferred embodiment of our invention and in which like characters of reference designate the same or corresponding parts in all the views.

Figure 1:
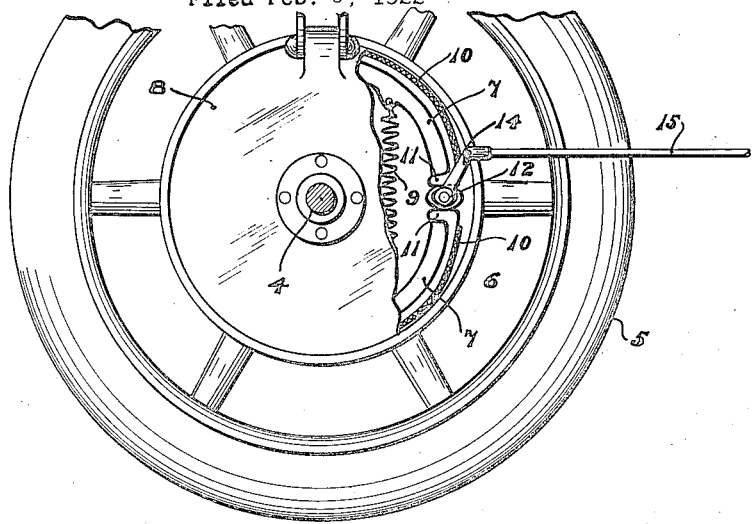

Figure 1 is a broken fragmentary side elevation of the rear wheel and brake drum—partly in section, partly broken away—to particularly disclose the hub brake shoe and mechanism for operating the same.

Figure 2:
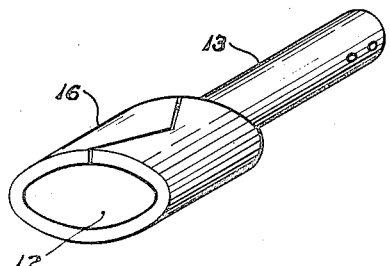
Figure 3:
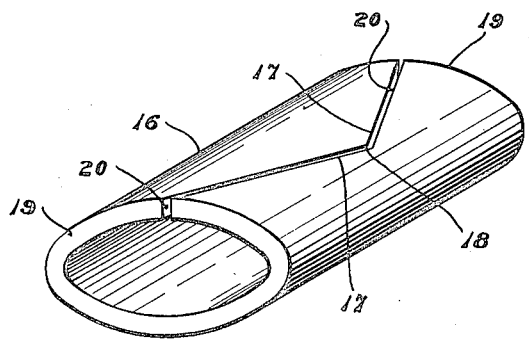

Figure 2 is a perspective view of our improved brake shoe spreader or sleeve as applied upon a brake operating cam; and, Figure 3 is an enlarged perspective view of our elliptical sleeve or band removed from the brake cam.

Referring more particularly to the drawings we will now describe the ordinary type of brake in which the numeral 4 designates the rear axle of an automobile on which is mounted to turn therewith the wheel 5 which carries on its hub portion a drum 6 in which is contained a brake shoe 7, which consists of opposed segments which are pivoted together and carried by a stationary closure plate 8. The brake shoe 7 is normally held together and out of breaking contact with the drum 6 by a pair of springs 9. On the outer face of the brake shoe segment 7 there is secured a liner or facing 10 of textile material to increase the braking efficiency.

The brake shoe segments 7—7 at their free ends are enlarged or shouldered to provide spaced portions 11, 11 between which is located the brake cam 12 which is integral with or mounted upon a rod or shaft 13 having secured thereto a crank 14 the free end of which is pivotally connected to an operating rod 15 whereby said cam 12 may be caused to turn to effect the spreading of the brake shoe segments 7, 7 and force same into contact with the inner face of the drum 6 to complete the braking operation.

With the continual or intermittent use of the brake, cam 12 and the opposed faces 11, 11 rapidly wear away, the result being to lessen the spreading of the brake segments 7, 7 and hence the latter do not tightly engage or grip the inner face of the brake drum 6 to produce the requisite braking effect when the brake is applied. To overcome this defect when the cam 12 becomes worn we have provided a split band or sleeve 16 of spring steel or other appropriate material which is adapted to be sprung over the worm cam 12 and thereby bring the cam back to its normal size and at the same time take up for the wear on the brake segment ends 11, 11 by increasing the throw of the cam 12 in the spreading of the brake segments 7, 7 in the operation of applying the brake.

The aforesaid band or sleeve 16 consists of an elliptical member of substantially but slightly less contour than that of the cam 12 in order that the same may be sprung over said cam and fitted tightly thereon. This elliptical band or sleeve is longitudinally slit throughout its length with what may be termed when looking at the same in plan as a feather or V-shaped slit 17, the apex 18 thereof being located directly central intermediate the ends 19 of said sleeve whereby said opposed ends of the sleeve are maintained in direct registration relative to the end of the cam 12. It is here to be particularly noted that due to the peculiar formation of the aforesaid slit 17 that the sleeve will automatically maintain its proper position on the cam 12, while the opposed flat faces 20 of the V-shaped slit will obviate any tendency to torsional distortion and we lay great stress upon this feature. In this we are fully aware it has been proposed heretofore to provide a brake shoe spreader having a longitudinally curved slit therein, but we have found in practice that the same has many inherent disadvantages and primarily of which is the fact that such curved surfaces have a natural tendency to ride over one another whereby distortion of the spreaders inevitably results.

In the operation of the brake cam 12 with a spreader sleeve or band of the type hereinbefore described, it will be readily seen that the peculiar formation of the slit 17 ensures against the distortion of said sleeve 16 when the same is in use, the central apex 18 on one side of the slit always tending to centralize itself or engage in the opposed apex on the other side of the slit whereby the opposed ends 19 of the sleeve are prevented from being distorted longitudinally in the operation of the brake.

Having described our invention, what we claim as new and desire to secure by Letters Patent is:

1. A brake shoe spreader comprising an open ended elliptical sleeve having a longitudinal split therein, said longitudinal split being of substantially V-shaped formation in plan whereby the apices of the V-shaped slit are always maintained in direct alignment and the ends of said sleeve are prevented from distortion.

2. The combination with a brake shoe spreader for the brakes of automobiles, of a spreader sleeve adapted for fitment on the brake operating cam, said sleeve being of elliptical cross-section and having a longitudinal V-shaped slit therein whereby said sleeve is always maintained in proper registration on the brake operating cam.

3. As a new article of manufacture a brake shoe spreader for automobile brake operating cams consisting of an elliptical sleeve having a longitudinal V-shaped slot therein whereby said sleeve is adapted for ready expansion onto a brake operating cam and secure retention thereon.

In testimony whereof we affix our signatures.

EDWARD F. SHIMER.
RAYMOND I. FREY.